US009880985B2

(12) United States Patent
Salazar (10) Patent No.: US 9,880,985 B2
(45) Date of Patent: *Jan. 30, 2018

(54) REVISION OF A PORTION OF A DOCUMENT VIA SOCIAL MEDIA

(71) Applicant: International Business Machines Corporation, Armonk, NY (US)

(72) Inventor: Fernando Salazar, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,259

(22) Filed: Jun. 3, 2014

(65) Prior Publication Data

US 2015/0113376 A1 Apr. 23, 2015

Related U.S. Application Data

(63) Continuation of application No. 14/057,239, filed on Oct. 18, 2013.

(51) Int. Cl.
*G06F 17/24* (2006.01)
*G06Q 10/10* (2012.01)
(Continued)

(52) U.S. Cl.
CPC ........... *G06F 17/24* (2013.01); *G06Q 10/101* (2013.01); *G06Q 50/01* (2013.01)

(58) Field of Classification Search
CPC ..... G06F 17/2235; G06F 17/24; G06Q 50/01; G06Q 10/101
See application file for complete search history.

(56) References Cited

U.S. PATENT DOCUMENTS 7,496,841 B2 * 2/2009 Hadfield ................ G06Q 10/10
707/999.007
8,769,012 B1 * 7/2014 Shah ...................... G06Q 50/01
709/204
(Continued)

FOREIGN PATENT DOCUMENTS

CN 1531697 A 9/2004
CN 101588350 A 11/2009
(Continued)

OTHER PUBLICATIONS

OTRS "Information Rights Management", Feb. 20, 2012, retrieved from http://helpdesk.staloysiuscincinnati.org/otrs/public.pl?Action=PublicFAQPrint;ItemID=57 on Jun. 23, 2016.*
(Continued)

*Primary Examiner* — Cesar Paula
*Assistant Examiner* — Konrad Kulikowski
(74) *Attorney, Agent, or Firm* — Cantor Colburn LLP; Ryan Lewis (57) ABSTRACT

Document revision via social media includes receiving a portion of a document and contact information of a reviewer to be notified for reviewing the portion of the document. The contact information of the reviewer corresponds to a social network. Document revision via social media also includes storing the portion of the document and the contact information of the reviewer into a memory, generating a link referencing the portion of the document stored into the memory, and publishing the link to the reviewer for the reviewer to access the portion of the document for reviewing via the social network.

16 Claims, 5 Drawing Sheets

(51) Int. Cl.
*G06Q 50/00* (2012.01)
*G06F 17/22* (2006.01)

(56) References Cited

U.S. PATENT DOCUMENTS

| | | |
|---|---|---|
| 2006/0026502 A1 | 2/2006 | Dutta et al. |
| 2006/0282762 A1 | 12/2006 | Diamond et al. |
| 2009/0217196 A1 | 8/2009 | Neff |
| 2011/0178981 A1 | 7/2011 | Bowen et al. |
| 2011/0246502 A1 | 10/2011 | Aguera Y Arcas et al. |
| 2012/0072855 A1 | 3/2012 | Baldwin et al. |
| 2012/0216290 A1 | 8/2012 | Roy et al. |
| 2012/0278401 A1* | 11/2012 | Meisels .................. G06F 17/24 709/206 |
| 2013/0055074 A1 | 2/2013 | Trese et al. |
| 2013/0055128 A1 | 2/2013 | Muti et al. |
| 2013/0080776 A1 | 3/2013 | Elduff et al. |
| 2013/0117376 A1* | 5/2013 | Filman .................. G06Q 10/10 709/205 |
| 2015/0113373 A1 | 4/2015 | Salazar |

FOREIGN PATENT DOCUMENTS

| | | |
|---|---|---|
| CN | 102227744 A | 10/2011 |
| CN | 102640162 A | 8/2012 |
| CN | 102664832 A | 9/2012 |

OTHER PUBLICATIONS

List of IBM Patents or Patent Applications Treated as Related—Date Filed: Oct. 18, 2013; 1 page.

U.S. Appl. No. 14/057,239; Final Office Action, Date Filed: Oct. 18, 2013; dated Feb. 25, 2016; 11 pages.

D. Lebow, "Document Review Meets Social Software and the Learning Sciences" JE-LKS, Methodologies and Scenarios, vol. 5, n. 1. Feb. 2009, pp. 171-180.

Social Collaboration Document Review Extensions URL: http://pic.dhe.ibm.com/infocenter/p8docs/v5r2m0/index.jsp?topic=%2Fcom.ibm.p8.ce.admin.tasks.doc%2Fp8pcc137.htm, Mar. 2013, 2 pages.

* cited by examiner

REVISION OF A PORTION OF A DOCUMENT VIA SOCIAL MEDIA

CROSS-REFERENCE TO RELATED APPLICATION

This application is a continuation of U.S. patent application Ser. No. 14/057,239, filed Oct. 18, 2013, the content of which is incorporated by reference herein in its entirety.

BACKGROUND

The present disclosure relates generally to document revision, and more specifically, to document revision via social media. Creation of documents is one of the most important and universal tasks for a knowledge worker. Such documents range from short pieces such as emails, executive summaries, posters or graphics, to longer pieces such as proposals, full presentations, whitepapers, specifications, sales projections and more. The quality of such documents is of great concern for both individuals and for the organizations that employ them. In both cases, the desire is for documents to be as correct, complete, informative and persuasive as possible.

Online social network services (SNSs) are playing an ever-important role in shaping the behavior of users on the web. Popular social sites (such as Facebook (Facebook is a Trade Mark of Facebook, Inc.), MySpace (MySpace is a Trade Mark of News Corporation), Flickr, and del.icio.us (Flickr and del.icio.us are Trade Marks of Yahoo!, Inc.), Twitter (Twitter is a Trade mark of Twitter, Inc.) are enjoying increasing traffic and are turning into community spaces, where users interact with their friends and acquaintances. Users are increasingly using social network services for communication and building a social network based on their, profession, likes, interests and need.

SUMMARY

According to embodiments of the present invention, there is provided a system, a computer program product and a method for document revision. The method includes receiving a portion of a document and contact information of a reviewer to be notified for reviewing the portion of the document. The contact information of the reviewer corresponds to a social network. The method further includes storing the portion of the document and the contact information of the reviewer into a memory. The method further includes generating a link referencing the portion of the document stored into the memory, and publishing the link to the reviewer for the reviewer to access the portion of the document for reviewing via the social network.

BRIEF DESCRIPTION OF THE SEVERAL VIEWS OF THE DRAWINGS

Through the more detailed description of some embodiments of the present disclosure in the accompanying drawings, the above and other features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Existing document review methodologies present some challenges, e.g., they are asynchronous in nature, i.e., usually, reviewers are contacted by email or other asynchronous means, and the reviewers must respond by the same channel. In addition, the volume of content being shared can present challenges. A complete document is sent to the reviewers for review, and the reviewers are required to spend a significant amount of time reading and understanding the document before they can comment. Another challenge is in merging the suggestions, e.g., when reviewers send back their comments or feedback. The comments may be in different copies of the original document sent by the respective reviewers or in comments circulated outside the document, making it exceedingly difficult for the user or author to reconcile. Other concerns relate to unfamiliar file formats, security and access control for documents, access to document management systems, and reaching out to the right reviewers.

Figure 1:
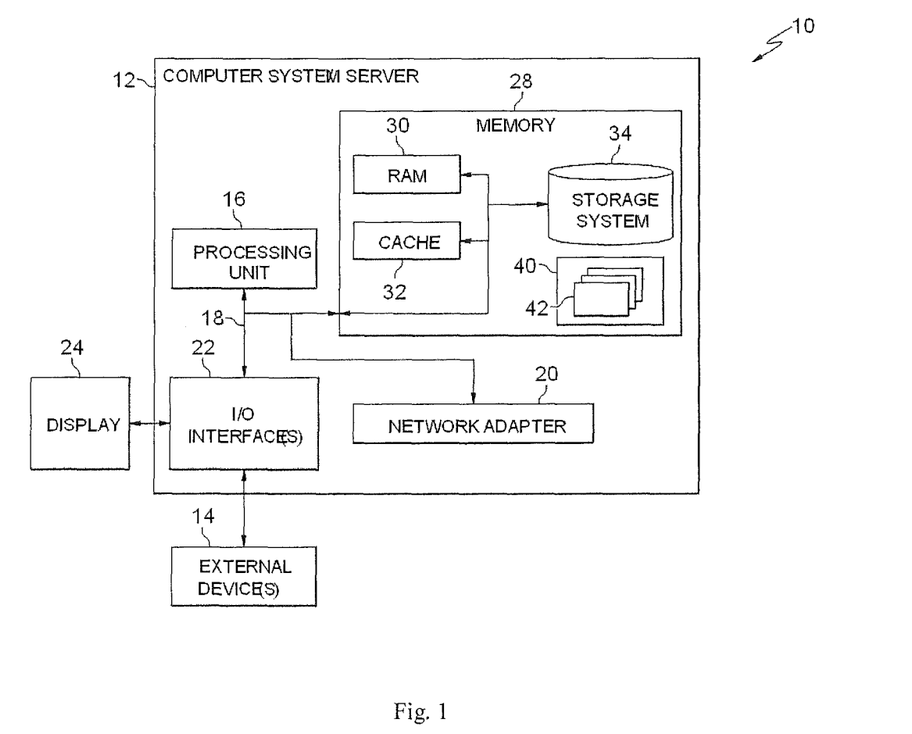
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
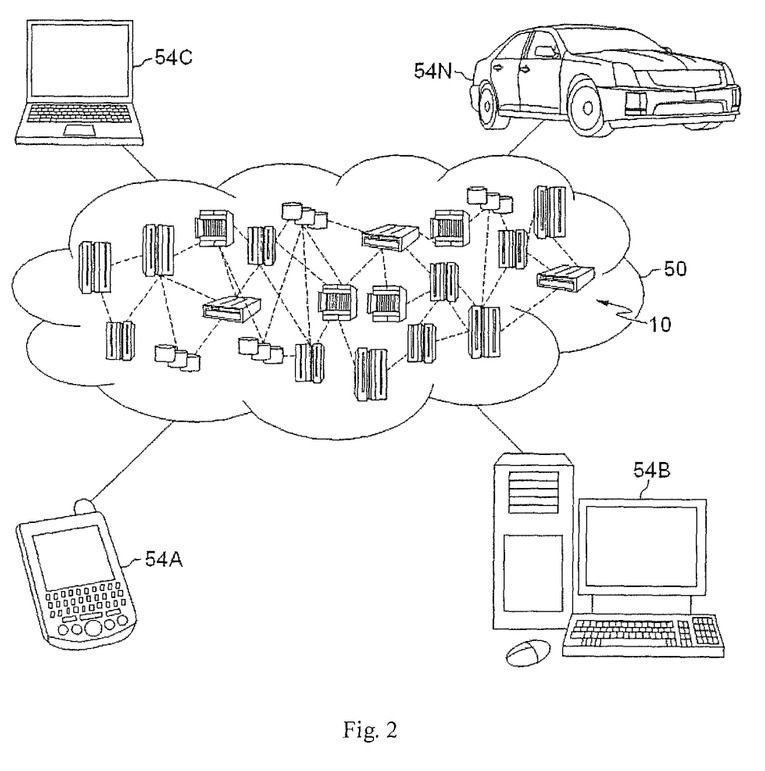
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
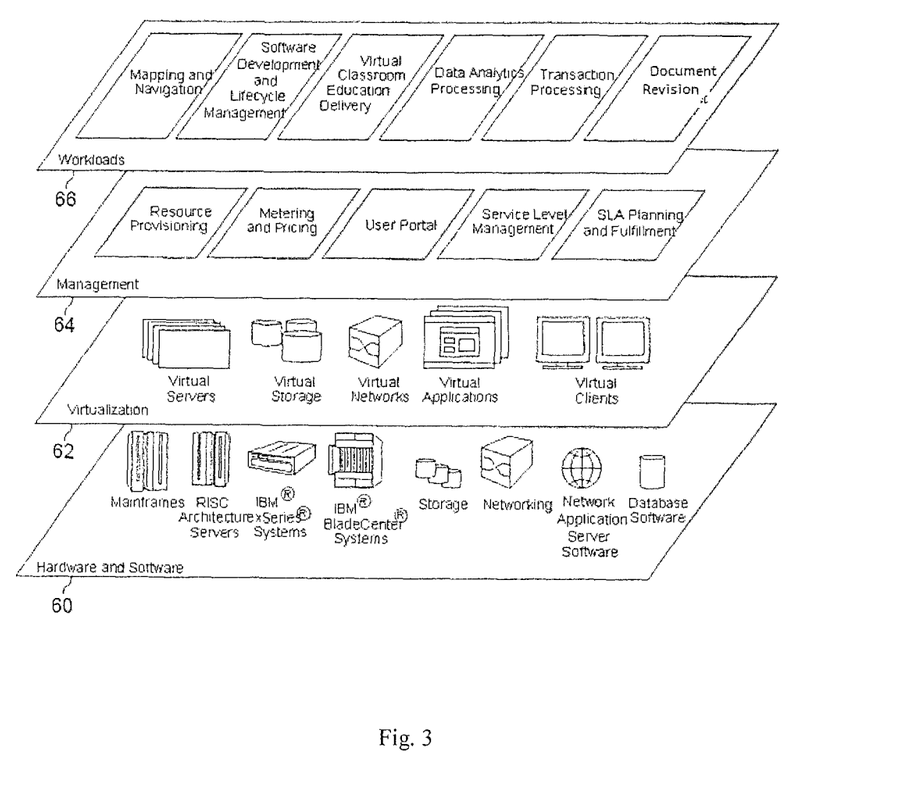
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network client, in one example IBM WebSphere® client; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in the management layer 64 is connection allocation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and document revision.

It is understood that all functions of the present invention as described herein typically may be performed by the document revision (workloads layer 66, which can be tangibly as modules of program code 42 of program/utility 40 of FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment known now or later developed.

Figure 4:
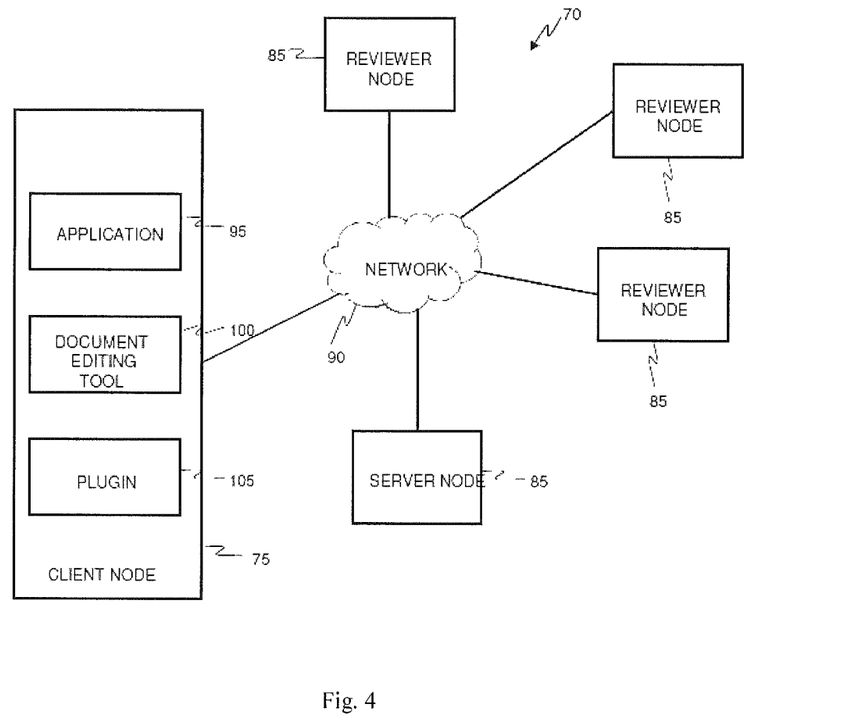
FIG. 4 depicts a system for document revision in accordance with an embodiment of the present invention.

FIG. 4 depicts a system 70 for document revision in accordance with aspects of the present invention. As shown in the example of FIG. 4, the system 70 includes a client node 75, a server node 80 and a plurality of reviewer nodes 85 operatively connected to a network 90. In general, the client node 75 may include the computing device 54A, 54B, 54C, or 54N of FIG. 2 operated by a user. The reviewer nodes 85 may include one or more of the computing devices 54A-N. The server node 80 may include the computer system 12 of FIG. 1.

According to one embodiment of the present invention, an application 95 resident on the client node 70 is integrated with a document editing tool 100. In general the application 95 may be implemented as a program 40 of FIG. 1 on the computing devices 54A-N of FIG. 2. For example, the application 95 may be integrated with the document editing tool 100 using a plugin 105. The document editing tool 100 can be any document editor installed on the client code 75. One example of the document editing tool is Microsoft Word (Microsoft is a Trade mark of Microsoft Corporation). In general, the application 95 and the plugin 105 may be implemented as programs 40 of FIG. 1 on the client node 70. In the shown example of FIG. 4, only one document editing tool 100 and a plugin 105 are illustrated as an example only. The client node 75 may have a plurality of different document editing tools 100 integrated with the application 95 via the respective plugins 105. According to one embodiment of the present invention, the application 95 integrated with the document editing tool 100 such that the application 95 can receive a portion of a document accessed via the document editing tool 100. A document owner desiring to provide a portion of a document to one or more reviewers for revision may select the portion of the document via the document editing tool 95 and invoke the application 95. The term "document owner" referred to herein means person desiring to share a portion of a document for review. The document owner may be an author of the document of the owner of the document. The portion of the document used herein may include, but not limited to, text, tables, graphics, images, videos. Thus, the portion of the document may comprise varied types of content and is not limited only text. For example, the portion of the document may correspond to one or more paragraphs selected by the document owner for review.

According to one embodiment of the present invention, the application 95 may be listed in the resulting menu provided by right-clicking of a mouse. The document owner may invoke the application 95 by right-clicking the mouse after selecting the portion of the document and selecting a reference command of the application 95 listed in the resulting menu.

On being invoked, the application 95 is configured to provide a graphical user interface (GUI) for the document owner to provide information as input. According to one embodiment of the present invention, the GUI may be configured to receive as input, contact information of the reviewers, level of confidentiality, and a message to be provided to the contacts. However, in certain implementations, GUI may be configured to receive other inputs from the document owner such as forwarding rights for the reviewers. For example, by providing forwarding rights to the reviewers, the document owner may allow the reviewers to forward the portion of documents to their contacts. For example, the reviewers may forward it to their social contacts using any social media. According to one embodiment of the present invention, the contact information of the reviewers may be social network contacts of the document owner. According to one embodiment of the present invention, social network contacts of the document owner may be pre-categorized and the category of contacts to which the portion of the document is to be provided for review is provided as input by the document owner. For example, the GUI may be configured to provide a drop down menu listing the categories. The document owner may select one or more categories from the drop down menu. The application 95 may be configured to identify all the contacts categorized under the selected category to be the contacts the document owner is interested in forwarding the portion of the document for revision.

According to one embodiment of the present invention, the GUI may be configured to list out different levels of confidentiality and the document owner may select the level of confidentiality by making the appropriate selection on the GUI. For example, the different levels of confidentiality can be presented as a drop-down menu and the document owner may select the level of confidentiality by making the selection from the drop down list. The application 95 may be configured to apply the level of confidentiality to the portion of document. For example, if the level of confidentiality selected is "company confidential", then the portion of the document for review is to be forwarded only to the contacts within the company of the document owner even though the contacts are included in the selected category. According to one embodiment of the present invention, the information of the company of a contact may be obtained from a profile of the contact on a social network. The GUI may also be configured to receive other information from the document owner and accordingly may be configured to list the options.

According to one embodiment of the present invention, the GUI may comprise a dialog box and the document owner may input a message to be provided to the contacts with the portion of the document. On the document owner submitting the revision request, the application 95 is configured to receive the portion of the document and the information provided by the document owner as input. For example, the information may comprise the contact details of the reviews, the level of confidentiality and the message. On receiving the information, the application 95 is configured to determine the level of confidentiality and filter out the contact details of reviewers which do not satisfy the level of confidentiality selected by the document owner. Thereafter, the portion of the document, the filtered contact details of reviewers and the message is provided by the application 95 to the server node 80 via the network 90. The server node 80 on receiving the portion of the document, the filtered contact information of the reviewers and the message is configured to store the portion of the document and the filtered contact information of the reviewers into a memory (e.g., the memory 28 in FIG. 1) and assign a unique identification reference to the same.

According to one embodiment of the present invention, the server node 80 may be configured to generate a link referring to the stored portion of the document using the unique identification reference assigned. According to another embodiment, the server node 80 may be configured to generate the link referring to the stored portion of the document and the filtered contact information of the reviewers. For example, the link may be a hyper text markup language (HTML) link, a uniform resource locator (URL) and the like. The server node 80 generates a social message comprising the link and the message and the social message is published to the reviewers by the server node 80 using the filtered contact information of the reviewers via the network 90. As the contact information of the reviewers relates to social network contacts, the link and the message are published to the reviewers via social networks. For example, the social message can be published via the social sites corresponding to the contact information of the reviewers. According to another embodiment of the present invention, the server node 80 may generate the social message using the link in aspects where the document owner has not provided any message. The reviewers may view the social message by accessing the social site of the reviewer to which the social message has been published.

The reviewers access the portion of the document for review using the link. In the shown example of FIG. 4, the reviewers access the portion of the document via the reviewer nodes 85. According to one embodiment of the present invention, the access to the portion of the document may be a web based access. The web based access may comprise an authentication mechanism for providing access to only authenticated reviewers. According to an embodiment of the present invention, the authentication mechanism may be performed using the authentication process of the social sites. The reviewers may review the portion of the document via the web based access and may provide comments or suggestions as inputs via the web based access. The comments provided by the reviewers are received and collected by the server node 80. The server node 80 may be configured to identify the portion of the document to which a comment or suggestion from a reviewer relates and store it accordingly. For example, this can be achieved by the unique identification reference for each portion of the document used in the link. The unique identification reference enables in identifying to which portion of a document the comment or suggestion relate. The access to the portion of the document for review being web based provides the advantage of eliminating the requirement of the reviewers to use particular editing tool is eliminated.

The comments from the reviewers received by the server node 80 are forwarded to application 95. The application 95 is configured to receive the comments and notify the document owner of the comments. For example, the notification may be provided as a popup notification. The document owner may click on the popup notification to view the comment. According to one embodiment of the present invention, the application 95 may be configured to provide a command within the notification, so that when the command is clicked by the document owner, the portion of the document submitted for review comes to the foreground of the display of the client node 75. A mechanism may be provided so that the document owner may invoke the application 95 directly while viewing the portion of the document. For example, the application 95 may be invoked using a right-click of the mouse and selecting the appropriate command in the drop down menu. On invoking the application 95, comments received from all the reviewers are displayed to the document owner. The application 95 may retrieve the comments from the server node 80. However, the document owner may also view the comments collected by the server node 80. This may be achieved by the document owner accessing the server node 80 via the application 95 on the client node 75. As the server node 80 is configured to collect the comments from the reviewers, the document owner can access the comments stored by the server node 80.

According to one embodiment of the present invention, each of the comments may be associated with a command so that the document owner can directly accept the comment by clicking the command. This will cause the portion of the document to be replaced by the comment. Thus, the comments received from the reviewers may be seamlessly merged with the document. According to another embodiment of the present invention, the document owner may select only a portion of the comment from a reviewer and then indicate the acceptance only for the selected portion by clicking the command. In this case, the related text of the portion of the document is replaced by the selected portion of the comment. The plugin 105 integrating the document editing tool 100 and the application 95 may be configured to merge the comments with the document.

According to another embodiment of the present invention, the application 95 may provide the portion of the document and the information to the server node 80. The server node 80 may be configured to store the portion of the document and the contact details of the reviewers into the memory and assign a unique identification reference to the same. The server node 80 may generate a link referring to the stored portion of the document and the contact details of the reviewers. The server node 80 generates a social message comprising the link and the message and the social message is forwarded to the reviewers by the server node 80 using the contact details of the reviewers via the network 90. However, in the present embodiment, as the contact details are not filtered out by the application 90, the reviewers who are in the same company of the document owner will only be authenticated at the authentication mechanism. This may be achieved by configuring the server node 80 to allow access to reviewers whose credentials matches with the level of confidentiality applied. According to another embodiment of the present invention, the server node 80 may be configured to publish the link and the message to the reviewers who satisfy the level of confidentiality applied. Thus, in this case, the server node 80 may be configured to filter the contact information based on the level of confidentiality applied.

According to one embodiment of the present invention, comment provided by one reviewer may be seen by other reviewers. For example, a first review may be provided a read access to the comments received from a second reviewer. This is achieved since the reviewers have web access to the portion of the document. Thus, the comments collected by the server node 80 may be visible to the reviewers as the server node 80 stores the comments by identifying as to which portion of the document the comments relate.

In aspects where a document owner desires to have multiple portions of a document reviewed, the document owner may follow the embodiments described herein for each of the portions. By publishing only the relevant portions of the document, the reviewer's time is not wasted as the reviewer does not see the complete document.

According to one embodiment of the present invention, the application 95 may be configured to provide various statistics on document revision to the document owner. For example, the application may be configured to determine what types of documents are being edited. This may be determined through the category of the reviewers selected by the document owner. The application 95 may also be configured to determine which reviewers are active in providing comments. Thus, the document owner can be made aware as to which reviewer is active and who is not. The application 95 may also be configured to determine reviewers whose comments are more frequently incorporated by the document owner. For, example a score can be assigned to each reviewer based on this and the document owner can be made aware of this score so that the document owner can ascertain as to on which comment he can rely. The score may also be used for rewarding the reviewers. Thus statistics may be provided by to the document owner on the frequency of response of a reviewer. The application 95 may also be configured to determine statistics, such as, total number of revisions of a document, total number of revisions requested by a document owner, and the like.

Figure 5:
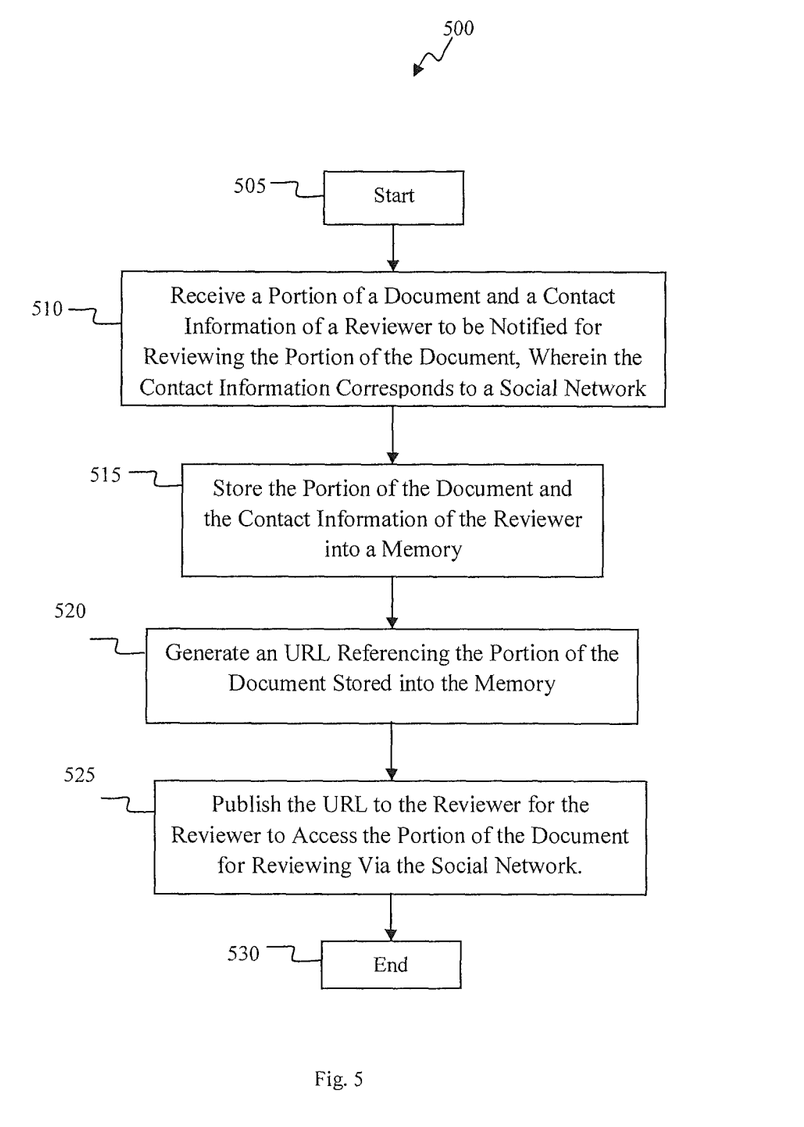
FIG. 5 shows an exemplary flow for performing an embodiment of the present invention.

FIG. 5 depicts an exemplary flow for a process 500 in accordance with aspects of the present invention. In embodiments, the process 500 can be performed by the communication adapter 95 in FIG. 4.

At step 505, the process starts. At step 510, the server node (e.g., the server node 80 in FIG. 4) is receives a portion of a document and a contact information of a reviewer to be notified for reviewing the portion of the document. The portion of the document can be sent by the application (e.g., the application 95 in FIG. 4) running on the client node 75 (e.g., the client node 75 in FIG. 4). At step 515, the server node stores the portion of the document and the contact information of the reviewer into a memory (e.g., the memory 28 in FIG. 1). At step 520, the server node generates a link referencing the portion of the document stored into the memory. At step 525, the server node publishes the link to the reviewer for the reviewer to access the portion of the document for reviewing. At step 530, the process ends.

The embodiments described herein enable in revision of a portion of a document. Since a portion of the document can be published to the reviewers for review, the complete document is not required to be forwarded to the reviewers. This achieves in reducing the time invested by the reviewers for reviewing as the reviewer is not required to go through the complete document. Additionally, since only the desired portion of the document requiring review is published, the likelihood of receiving comments from reviewers is high as it requires less time for a reviewer to review the portion of the document then the entire document. This achieves in increasing the efficiency of the document review process. The comments provided by the reviewers can be reconciled with ease using the application. As the reviewers are provided web based access, the reviewers can see the comments provided by others. This provides the advantage of collaborated reviewing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for document revision in a computing environment, the method comprising:

receiving, at a computer processor from a document owner via a social media network, a portion of a document and an identification of at least one social media network contact to be notified for reviewing the portion of the document;

storing the portion of the document and the identification of the at least one social media network contact, as a reviewer of the portion of the document, into a memory;

generating a link referencing the portion of the document stored in the memory;

publishing the link to the reviewer for the reviewer to access the portion of the document for reviewing via the social media network;

receiving, at the computer processor, a proposed edit associated with the portion of the document from the reviewer, wherein the received proposed edit is accessible to the document owner;

receiving, from the document owner, an indication of one of an acceptance of the proposed edit and a rejection of the proposed edit;

determining reviewers whose proposed edits are more frequently accepted by the document owner; and indicating the determined reviewers to the document owner;

wherein the acceptance causes the computer processor to automatically update the portion of the document to include the proposed edit, and the rejection causes the computer processor to maintain the portion of the document without the proposed edit;

wherein receiving the identification of the at least one social media network contact includes receiving a user-selected, pre-defined category of social media network contacts, the method further comprising:

receiving a level of confidentiality indicator from the document owner for assignment to the portion of the document; and applying a filter to the social media network contacts listed in the category based on the level of confidentiality indicator and a social media network profile for each of the social media network contacts in the category;

wherein publishing the link to the reviewer comprises publishing the link for only those social media network contacts that meet criteria of the filter.

2. The method of claim 1, further comprising storing the proposed edit in the memory.

3. The method of claim 1, further comprising providing a notification of the proposed edit received from the reviewer to the document owner.

4. The method of claim 1, further comprising providing a first reviewer a read access to the proposed edit received from a second reviewer, the second reviewer authorized by the document owner to forward the comment to the first reviewer, the first reviewer is not listed in contact information received from the document owner, the proposed edit being stored in the memory.

5. The method of claim 1, wherein the storing of the portion of the document and the identification of the at least one social media network contact of the reviewer in the memory comprises assigning a unique identification reference to the portion of the document and the at least one social media network contact.

6. The method of claim 5, wherein the link comprises the unique identification reference.

7. The method of claim 1, wherein the link provides a web based access to the portion of the document to the reviewer for reviewing.

8. A computer program product for document revision, the computer program product comprising:

a non-transitory computer readable storage medium having stored thereon program instructions executable by a computer system to:

receive, from a document owner via a social media network, a portion of a document and an identification of at least one social media network contact to be notified for reviewing the portion of the document;

store the portion of the document and the identification of the at least one social media network contact, as a reviewer of the portion of the document, in a memory;

generate a link referencing the portion of the document stored in the memory;

publish the link to the reviewer for the reviewer to access the portion of the document for reviewing via the social media network;

receive a proposed edit associated with the portion of the document from the reviewer, wherein the received proposed edit is accessible to the document owner;

receive, from the document owner, an indication of one of an acceptance of the proposed edit and a rejection of the proposed edit;

determine reviewers whose proposed edits are more frequently accepted by the document owner; and indicate the determined reviewers to the document owner;

wherein the acceptance causes the computer system to automatically update the portion of the document to include the proposed edit, and the rejection causes the computer system to maintain the portion of the document without the proposed edit;

wherein receiving the identification of the at least one social media network contact includes receiving a user-selected, pre-defined category of social media network contacts, the program instructions further executable to:

receive a level of confidentiality indicator from the document owner for assignment to the portion of the document; and apply a filter to the social media network contacts listed in the category based on the level of confidentiality indicator and a social media network profile for each of the social media network contacts in the category;

wherein publishing the link to the reviewer comprises publishing the link for only those social media network contacts that meet criteria of the filter.

9. The computer program product of claim 8, further comprising program instructions executable by the computer system to store the proposed edit in the memory.

10. The computer program product of claim 8, further comprising program instructions executable by the computer system to provide a notification of the proposed edit received from the reviewer to the document owner.

11. The computer program product of claim 9, further comprising program instructions executable by the computer system to provide a first reviewer a read access to the proposed edit received from a second reviewer, the second reviewer authorized by the document owner to forward the comment to the first reviewer, the first reviewer is not listed in contact information received from the document owner, the proposed edit being stored in the memory.

12. The computer program product of claim 8, wherein storing the portion of the document and the identification of the at least one social media network contact of the reviewer in the memory comprises assigning a unique identification reference to the portion of the document and the at least one social media network contact.

13. The computer program product of claim 8, wherein the link is generated using the unique identification reference.

14. The method of claim 1, further comprising differentiating the portion of the document from other portions of the same document stored in the memory by the document owner via corresponding unique identification references.

15. The method of claim 1, further comprising:
assigning, by the document owner, forwarding rights to the at least one reviewer with respect to the portion of the document, the forwarding rights configured to selectively enable and prevent the ability of the at least one reviewer to forward the portion of the document to other individuals through the social network.

16. The method of claim 1, wherein the level of confidentiality indicator is company confidential, and application of the filter includes determining an employer of the social media network contacts listed in the category from the corresponding social media network profiles; wherein the link is published to the social media contacts who share the same employer as the document owner.

* * * * *